United States Patent Office 3,391,203
Patented July 2, 1968

3,391,203
α-(2,2-DICHLOROETHYL)STYRENE
Dalton L. Decker, Midland, Mich., assignor to The Dow Chemical Company, Midland, Mich., a corporation of Delaware
No Drawing. Filed Oct. 10, 1963, Ser. No. 315,377
1 Claim. (Cl. 260—651)

The present invention is concerned with organic chemistry and with α-(1-haloalkyl) styrene compound corresponding to the formula

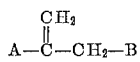

In the above and succeeding formula herein A represents substituted or unsubstituted phenyl and B represents a 1-haloalkyl radical.

More particularly, the present invention is directed to a compound selected from the class consisting of those compounds of the formula

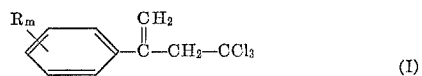 (I)

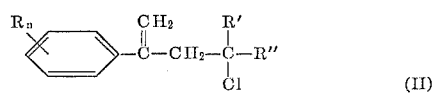 (II)

and

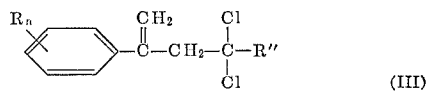 (III)

In the above and succeeding formulae herein, subject only to known considerations of steric hindrance, each R independently represents a member selected from the group consisting of halogen and loweralkyl being of from 1 to 4, inclusive, carbon atoms; R' represents a member selected from the group consisting of iodine, bromine, and fluorine; R" represents a member selected from the group consisting of halogen and lower alkyl being of from sents an integer of from 1 to 5, both inclusive; and $n$ represents an integer of from 0 to 5, both inclusive. In the present specification, and claims, the unmodified term "halogen" is used to refer to iodine, bromine, chlorine, and fluorine.

The present products are oils or crystalline solid materials at room temperatures, of low solubility in water but readily soluble in many common organic solvents, such as, for example, acetone and benzene. The compounds are useful as parasiticides, and are particularly useful for the control of various insect, helminth, and macterial organisms, such as, for example, round worms, ascarids, tapeworms, pinworms, house flies, Daphnia, *Pullularia pullulans, Aspergillus terreus,* and *Staphylococcus.*

The products of the present invention are readily prepared by causing a reaction between, on the one hand, a halogenated compound of the formula

wherein X is halogen of a molecular weight equal to or greater than the molecular weight of any other halogen component of said halogenated compound, with, on the other hand, an alpha-methylstyrene compound of the formula

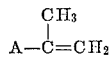

The reaction is caused by contacting the reactants together under the influence of a free-radical initiator. As free-radical initiator, there is preferably employed a catalyst system comprising an organic amine compound and a copper-containing material.

The reaction is exothermic and at least initiates satisfactorily at temperatures over a wide range, as, for example, —50° to 200° C. Preferably, the reaction is conducted at temperatures of from about 25° to 100° C. The pressure under which the reaction is carried out is not critical; conveniently, atmospheric pressures are employed.

The reaction can be carried out in the presence or absence of an inert liquid reaction medium. Suitable organic liquids which can be employed as inert liquid reaction medium include hydrocarbons such as pentane, benzene, and cyclohexane; and ethers, such as diethyl ether. It is preferred to avoid the use of a halogenated or olefinic organic compound as reaction medium, unless the same substance is to serve also as a reactant. Conveniently, excess halogenated compound or α-methylstyrene reactant can be employed as reaction medium when the compound or reactant is a liquid at temperatures within the reaction temperature range.

The amine-copper system can be prepared in advance and then added to the reaction. Alternatively, the amine and copper can be added separately to the reaction mixture to prepare the catalyst in situ. The amine is, at first, in any case, a free amine and not, for example, an acid salt of the amine. Various amines can be employed in the catalyst system and although some are more effective than others, the identity of the particular amine employed is not critical. Preferred amines are piperidine, diethylamine, diisopropylamine, 2,4-dimethylaniline, dibenzylamine, 3 - picoline, butylamine, isobutylamine, dicyclohexylamine, hexylamine, and hexadecylamine. More preferred amines are those of the above which are secondary amines. The identity of the particular component which constitutes the source of the copper in the system is not critical. The copper, which is an essential part of the catalyst system, can be derived from any of a great many copper-containing substances; suitable copper materials include, for example, metallic copper, copper acetate, copper benzoate, cuprous bromide, cuprous carbonate, cupric carbonate, cupric chloride, cuprous chloride, cupric formate, cuprous hydroxide, cuprous iodide, cuprous nitrate, cuprous oxide, cuprous sulfate, and cupric sulfate. The preferred copper material is anhydrous cuprous chloride.

The amount of each component of the catalyst system to be employed according to the present invention is critical only in that the components must be present in such amounts as in combination to exert a catalytic effect on the reaction. Minute traces, such as 0.0001 atomic equivalent copper, and 0.01 molecular equivalent amine per molecular equivalent of that reactant which is present in limiting quantity, usually give satisfactory results.

The amounts of the reactants to be employed are not critical, some of the desired product being formed when employing any amounts. However, when it is desired to obtain higher yields within shorter reaction time and to employ the reactants in the amounts most efficient for complete conversion, it is preferred to employ one molecular proportion of the α-methylstyrene reactant and from 1.0 to 4.0 molecular proportions of the halogenated compound. The reaction also proceeds when α-methylstyrene product is present in excess, such as one molecular proportion of halogenated compound and from one to four molecular proportions of α-methylstyrene compound.

In carrying out the reaction to prepare the products of the present invention, halogenated compound and α-methylstyrene compound are contacted together in the presence of a catalytic amount of the mixture of copper-containing material and the organic amine compound.

Some of the desired product is prepared immediately upon the contacting together of the reactants and catalyst; however, higher yields result if the reaction mixture is given a longer reaction time. Also, yields of desired product are increased if, at the termination of the reaction period, the reaction mixture is heated to a temperature of about 125° C. for a period of time, or the reaction mixture is refluxed with a base, such as, for example, alcoholic KOH or an organic amine compound. Such product-containing reaction mixture can be employed as prepared for the useful purposes of the present invention. Alternatively, the product can be separated from reaction mixture and from excess reactant or reactants by conventional procedures such as, for example, fractional distillation under subatmospheric pressure, filtration, and the like. Typically, the products are liquids and can be conveniently separated by distillation.

Where it is desired, the separated product can be purified in known procedures such as fractional distillation under subatmospheric pressure or recrystallization.

In an alternative procedure, the Formula I compounds are prepared by reaction of halogenated compound and α-methylstyrene compound in the presence of ultraviolet light, an organic compound such as a peroxide, or gamma-radiation, as free-radical initiator. In some reactions, heat alone can be employed as a free-radical initiator. In such operations, the foregoing conditions, wherein the amine-copper system serves as free-radical initiator, are employed except that larger amounts of halogenated compound are preferably employed and longer reaction periods are frequently necessary. Thus, one molecular proportion of α-methylstyrene reactant and from 2 to 20 or more molecular proportions of halogenated compound are preferably employed. Reaction periods of 5 to 50 hours are frequently necessary.

The ultraviolet light source can be any of those commonly employed; conveniently, a commercial "sunlamp", that is, a low-pressure mercury arc lamp, is employed. The organic compound can be any known free-radical initiator, such as, for example, acetyl peroxide, benzoyl peroxide, lauroyl peroxide, azobisisobutyronitrile, and the like.

The following examples illustrate the best embodiment now known of the present invention and will enable those skilled in the art to practice the present invention.

Example 1.—α-(2,2-dichloroethyl)-3,4-dichlorostyrene

Bromodichloromethane (164 grams; 1.0 mole), and 0.25 gram of cuprous chloride are combined, with stirring, to prepare a first mixture which is then heated to a temperature of 70° C. α-Methyl-3,4-dichlorostyrene (94.0 grams; 0.15 mole) and 10 grams of piperidine are mixed together to prepare a second mixture, which second mixture is thereafter added to the first mixture proportionwise over a period of 30 minutes. During the addition, the resulting reaction mixture is continually stirred and the temperature of the mixture is maintained at 70° C. After the completion of the addition, the reaction mixture is washed with water to obtain a liquid residue. Distillation of the liquid residue is begun; excess halogenated compound and α-methylstyrene product distill first. At about 100° C., there is evolved a gas. As a result of these operations, there is produced the α-(2,2-dichloroethyl)-3,4-dichlorostyrene product which boils at 125° C. at 0.4 millimeter mercury pressure, absolute. The product has a refractive index $n$ measured at 25° C. for the D line of sodium light of 1.5868.

Example 2.—α-(2-bromo-2-chloroethyl)styrene

α-Methylstyrene (472 grams; 4.0 moles), dibromochloromethane (1668 grams; 8.0 moles); cuprous chloride (1.0 gram), and piperidine (34.0 grams) were placed in a vessel and the combined mixture heated to a temperature of 100° C. The reaction mixture was held at the 100° C. temperature for a period of about 16 hours; after about the first four hours of this period, a small amount of dicyclohexylamine was added to the reaction mixture.

The reaction mixture was thereafter steam distilled to remove excess dibromochloromethane and evolved gas. The liquid material remaining following the steam distillation was washed with water and distilled in vacuo to remove unreacted α-methylstyrene from the washed liquid residue; distillation was continued, and when the temperature of the remaining mixture reached about 100° C., further evolution of gas occurred, yielding the α-(2-bromo-2-chloroethyl)styrene product residue. The product boils at 75° C. at 0.15 millimeter mercury pressure absolute, and has a refractive index $n$ measured at 25° C. for the D line of sodium light of 1.5735.

In a similar manner, other products of the present invention are prepared as follows:

From α-methyl-meta-isopropylstyrene and carbon tetrachloride, α-(2,2,2-trichloroethyl)-meta-isopropylstyrene product. The product is a colorless liquid having a refractive index $n$ measured at 25° C. for the D line of sodium light of 1.5402. It boils at 105° C. at 0.3 millimeter.

From α-methyl-3,4,5-trichlorostyrene and carbon tetrachloride, α-(2,2,2-trichloroethyl)-3,4,5-trichlorostyrene product having a molecular weight of 338.9.

From α-methylstyrene and 1,1,1-trichloroethane, a colorless liquid α-(2,2-dichloropropyl)styrene product. The product boils at 59° C. at 0.3 millimeter and has a refractive index $n$ measured at 25° C. for the D line of sodium light of 1.5472.

From α-methyl-3,5-dibromostyrene and chloroform, α-(2,2-dichloroethyl)-3,5-dibromostyrene product having a molecular weight of 358.9.

From α-methylstyrene and chloroform, a colorless liquid α-(2,2-dichloroethyl)styrene product having a refractive index $n$ measured at 25° C. for the D line of sodium light of 1.5526 and boiling at 70° C. at 0.6 millimeter.

From α-methyl-3,4,5-trimethylstyrene and dibromodichloromethane, α-(2-bromo-2,2-dichloroethyl)-3,4,5-trimethylstyrene product having a molecular weight of 322.0.

From α-methyl-3,4-dimethylstyrene and chloroform, a colorless liquid α-(2,2-dichloroethyl)-3,4-dimethylstyrene product boiling at 101° C. at 0.4 millimeter and having a refractive index $n$ measured at 25° C. for the D line of sodium light of 1.5508.

From α-methyl-3-bromo-5-ethylstyrene and 1,1-dibromo-1-chloroethane, α-(2-bromo-2-chloropropyl)-3-bromo-5-ethylstyrene product having a molecular weight of 366.6.

From α-methyl-para-chlorostyrene and carbon tetrachloride, α-(2,2,2-trichloroethyl)-para-chlorostyrene product, a white crystalline material melting at 47.5° C. and boiling at 123° C. at 2.0 millimeter.

From α-methyl-para-n-propylstyrene and dibromochloromethane, α-(2-bromo-2-chloroethyl)-para-n-propylstyrene product having a molecular weight of 287.6.

From α-methyl-3,4-dimethylstyrene and carbon tetrachloride, a colorless liquid α-(2,2,2-trichloroethyl)-3,4-dimethylstyrene product boiling at 130° C. at 1.3 millimeter and having a refractive index $n$ measured at 25° C. for the D line of sodium light of 1.5588.

From α-methyl-para-chlorostyrene and 1,1,1-trichloroethane, and α-(2,2-dichloropropyl)-para-chlorostyrene product having a molecular weight of 249.6.

From α-methyl-meta-methylstyrene and carbon tetrachloride, a colorless liquid α-(2,2,2-trichloroethyl)-meta-methylstyrene product boiling at 76° C. at 0.55 millimeter and having a refractive index $n$ measured at 25° C. for the D line of sodium light of 1.5598.

From α-methyl-para-methylstyrene and dibromochloromethane, an α-(2-bromo-2-chloroethyl)-para-methylstyrene product having a molecular weight of 259.6.

From α-methyl-para-methylstyrene and chloroform, a colorless liquid α-(2,2-dichloroethyl)-para-methylstyrene product boiling at 68° C. at 0.14 millimeter and having a refractive index $n$ measured at 25° C. for the D line of sodium light of 1.5479.

From α-methylstyrene and 1,1-dibromo-1-chloroethane, α - (2 - bromo - 2 - chloropropyl)styrene product having a molecular weight of 259.6.

From α-methyl-3,4-dichlorostyrene and carbon tetrachloride, a colorless liquid α-(2,2,2-trichloroethyl)-3,4-dichlorostyrene product boiling at 110° C. at 0.2 millimeter and having a refractive index $n$ measured at 25° C. for the D line of sodium light of 1.5860.

From α-methyl-para-ethylstyrene and carbon tetrachloride, α - (2,2,2 - trichloroethyl) - para - ethylstyrene product having a molecular weight of 263.6.

From α-methyl-para-isopropylstyrene and carbon tetrachloride, a colorless liquid α-(2,2,2-trichloroethyl)-para-isopropylstyrene product boiling at 92° C. at 0.2 millimeter and having a refractive index $n$ measured at 25° C. for the D line of sodium light of 1.5440.

From α-methyl-3-ethyl-5-n-propylstyrene and carbon tetrachloride, α - (2,2,2-trichloroethyl)-3-ethyl5-n-propylstyrene product having a molecular weight of 305.7.

From α-methyl-para-methylstyrene and carbon tetrachloride, a colorless liquid α-(2,2,2-trichloroethyl)-para-methylstyrene product boiling at 90° C. at 0.2 millimeter and having a refractive index $n$ measured at 25° C. for the D line of sodium light of 1.5553.

From α-methyl-para-chlorostyrene and dibromochloromethane, α - (2-bromo-2-chloroethyl)-para-chlorostyrene product having a molecular weight of 280.02.

From α-methyl-para-chlorostyrene and triiodochloromethane, α-(2-chloro-2,2-diiodoethyl)-para-chlorostyrene product having a molecular weight of 452.9.

From α-methyl-ortho-methylstyrene and carbon tetrachloride, liquid α - (2,2,2 - trichloroethyl) - orthomethylstyrene product boiling at 125° C. at 10 millimeters.

From α-methylstyrene and diiodochlorofluoromethane, α - (2 - chloro - 2 - fluoro - 2 - iodoethyl)styrene product having a molecular weight of 310.5.

From α-methyl-meta-isopropylstyrene and dibromochlorofluoromethane, α-(2-bromo-2-chloro-2-fluoroethyl)-meta-isopropylstyrene product having a molecular weight of 305.6.

From α-methyl-para-isobutylstyrene and 1,1-dichloro-1 - fluoroethane, α - (2 - chloro - 2-fluoropropyl)-para-isobutylstyrene product having a molecular weight of 254.8.

From α-methyl-ortho-chlorostyrene and carbon tetrachloride, α - (2,2,2 - trichloroethyl) - ortho-chlorostyrene product. The product is a liquid boiling at 105° C. at 4.3 millimeters and having a refractive index $n$ measured at 25° C. for the D line of sodium light of 1.5637.

From α-methyl-3,5-difluorostyrene and diiodochloromethane, α - (2 - chloro - 2-iodoethyl)-3,5-difluorostyrene product having a molecular weight of 328.5.

From a-methyl-3-bromo-5-secondary-butylstyrene product and chloroform, α-(2,2-dichloroethyl)-3-bromo-5-secondary-butylstyrene product having a molecular weight of 336.1.

From α-methyl-3,5-diiodostyrene and dibromodichloromethane, α - (2 - bromo - 2,2 - dichloroethyl) - 3,5 - diiodostyrene product having a molecular weight of 531.9.

From α-methyl-2,4-dimethylstyrene and carbon tetrachloride, liquid α - (2,2,2 - trichloroethyl) - 2,4 - dimethylstyrene product boiling at 96–97° C. at 0.4 millimeter and having a refractive index $n$ measured at 25° C. for the D line of sodium light of 1.5484.

From α-methyl-para-iodostyrene and diiodobromochloromethane, α-(2-bromo-2-chloro-2-iodoethyl)-para-iodostyrene product having a molecular weight of 497.4.

From α-methyl-2,3,4,5,6-pentachlorostyrene and carbon tetrachloride, α - (2,2,2 - trichloroethyl) - 2,3,4,5,6-pentachlorostyrene product having a molecular weight of 407.8.

From α-methyl-para-methylstyrene and dichlorodifluoromethane, α-(2-chloro-2,2-difluoroethyl)-para-methylstyrene product having a molecular weight of 216.7.

From α-methyl-2,4,6-trimethylstyrene and carbon tetrachloride, liquid α-(2,2,2-trichloroethyl)-2,4,6-trimethylstyrene product boiling at 94° C. at 0.2 millimeter and having a refractive index $n$ measured at 25° C. for the D line of sodium light of 1.5437.

From α-methyl-2,3,4,5,6-pentachlorostyrene and dibromodichloromethane, α-(2-bromo-2,2-dichloroethyl)-2,3,4,5,6-pentachlorostyrene product having a molecular weight of 452.3.

From α-methyl-2-chloro-4-isopropylstyrene and diiododichloromethane, α - (2,2 - dichloro - 2 - iodoethyl) 2-chloro-4-isopropylstyrene product having a molecular weight of 403.5.

From α-methyl-para-n-butylstyrene and trichlorofluoromethane, α - (2,2 - dichloro-2-fluoroethyl)-para-n-butylstyrene product having a molecular weight of 275.2.

From α-methyl-2,4,5-trimethylstyrene and chloroform, a liquid α-(2,2-dichloroethyl)-2,4,5-trimethylstyrene product boiling at 95° C. at 0.7 millimeter and having a refractive index $n$ measured at 25° C. for the D line of sodium light of 1.5405.

From α - methyl - 2 - chloro - 4 - tertiary - butylstyrene and carbon tetrachloride, α-(2,2,2-trichloroethyl)-2-chloro-4-tertiary-butylstyrene product having a molecular weight of 326.1.

From α-methyl-para-iodostyrene and carbon tetrachloride, α-(2,2,2-trichloroethyl)-para-iodostyrene product having a molecular weight of 357.4.

From α-methyl-meta-fluorostyrene and carbon tetrachloride, α - (2,2,2 - trichloroethyl) - meta - fluorostyrene product having a molecular weight of 253.5.

From α-methyl-2,3,4,5-tetramethylstyrene and carbon tetrachloride, an α-(2,2,2-trichloroethyl)-2,3,4,5-tetramethylstyrene product. The product boils at 110–115° C. at 0.3 millimeter and has a refractive index $n$ measured at 25° C. for the D line of sodium light of 1.5559.

From α-methyl-3,5-dibromostyrene and carbon tetrachloride, α - (2,2,2 - trichloroethyl) - 3,5 - dibromostyrene product having a molecular weight of 393.4.

From α - methyl - 2,3,4,5,6 - pentamethylstyrene and dichlorofluoromethane, α - (2 - chloro - 2 - fluoroethyl) - 2,3,4,5,6-pentamethylstyrene product having a molecular weight of 254.8.

From α-methyl-2,5-dichlorostyrene and carbon tetrachloride, an α-(2,2,2-trichloroethyl)-2,5-dichlorostyrene product. The product boils at 112° C. at 1.5 millimeter and has a refractive index $n$ measured at 25° C. for the D line of sodium light of 1.5761.

From α-methyl-2,4,6-trichlorostyrene and 1-chloro-1,1-diiodoethane, α - (2 - iodo - 2 - chloropropyl) - 2,4,6 - trichlorostyrene product having a molecular weight of 409.9.

From α-methylstyrene and tribromochloromethane, α-(2,2-dibromo-2-chloroethyl)styrene product having a molecular weight of 324.4.

From α-methyl-2,5-dimethylstyrene and carbon tetrachloride, liquid α-(2,2,2-trichloroethyl)-2,5-dimethylstyrene product boiling at 104° C. at 0.7 millimeter and having a refractive index $n$ measured at 25° C. for the D line of sodium light of 1.5481.

The unmodified compounds possess the useful properties characteristic of the compounds of the present invention. However, it is inconvenient and frequently impossible to make practical use of these properties by employment of the unmodified compound; the compounds are preferably modified by the addition of a pesticidal adjuvant whereby their employment is greatly simplified and many of their useful properties become available. Such adjuvant may be a carrier quantity of a finely divided solid carrier, or an amount of emulsifying agent, with or without co-solvent, sufficient to emulsify the so-modified compound when it is dispersed in water.

A "carrier quantity" of inert finely divided solid is, for example, an amount sufficient to sorb and carry an otherwise liquid substance.

In representative operations, α-(2,2,2-trichloroethyl) para-methylstyrene was dispersed in an organic liquid carrier and the resulting dispersion employed for the control of various helminth organisms. In such operations, the dispersion of α-(2,2,2-trichloroethyl)-para-methylstyrene was mixed with fresh calf feces infested with various helminth organisms, such as Cooperia sp.; Trichostronglyus sp.; *Haemonchus contortus*; *Ostertagia ostertagi*; Esophogostomum sp. and Bunostomum sp., to prepare a culture medium containing 300 parts of the test compound per million parts by weight of ultimate mixture. The mixture was held under conditions of high humidity and temperature of 26–28° C. for about 5 days, at which time it was examined for the presence of helminth organisms There was found a 100% kill of helminth organisms in the medium containing the test compound, while in a control medium, there were abundant helminth organisms.

The α-methylstyrene reactant which is employed as starting material according to the present invention is prepared in known procedures for the introduction of an isopropenyl moiety as a nuclear substituent on an otherwise substituted or unsubstituted benzene ring. In the final step of such procedures, a benzeneisopropanol compound of

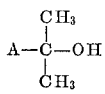

is reacted with a dehydrating agent, such as, for example, KHSO₄, acetic anhydride, or the like, to prepare the desired α-methylstyrene reactant.

The benzeneisopropanol compound is prepared in any of several methods of synthesis. For example, about one molecular proportion of benzoyl chloride of the formula

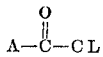

is reacted with about two molecular proportions of methylmagnesium halide (CH₃MgX) to prepare benzeneisopropanol compound. Alternatively, about one molecular proportion of methyl phenyl ketone of the formula

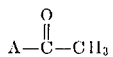

is reacted with about one molecular proportion of CH₃MgX. Also, benzeneisopropanol compound can be prepared by the reaction of a brominated compound of the formula

with magnesium to form a Grignard product, which, when first treated with acetone and later treated with water, yields the benzeneisopropanol compound.

I claim:
1. α-(2,2-dichloroethyl)styrene.

References Cited

UNITED STATES PATENTS 2,745,884   5/1956   Kundiger et al. _____ 260—651

OTHER REFERENCES

Overberger et al., J. Am. Chem. Soc., 77, pp. 369–73 (1955).

Kharasch et al., J. Org. Chem., vol. 18 (1953), pp. 328–336.

Heiba et al., J. Amer. Chem. Soc., vol. 79 (1957), pp. 4940–4.

BERNARD HELFIN, *Acting Primary Examiner.*

LEON ZITVER, *Examiner.*

T. G. DILLAHUNTY, K. V. ROCKEY, K. H. JOHNSON, *Assistant Examiners.*